May 26, 1970 M. NUSSBAUMER 3,513,528
LAYING DEVICE FOR COMMUTATOR CONTACT LOOPS ON AUTOMATIC
ARMATURE WINDING MACHINES FOR UNIVERSAL MOTORS
Filed July 11, 1967 3 Sheets-Sheet 2
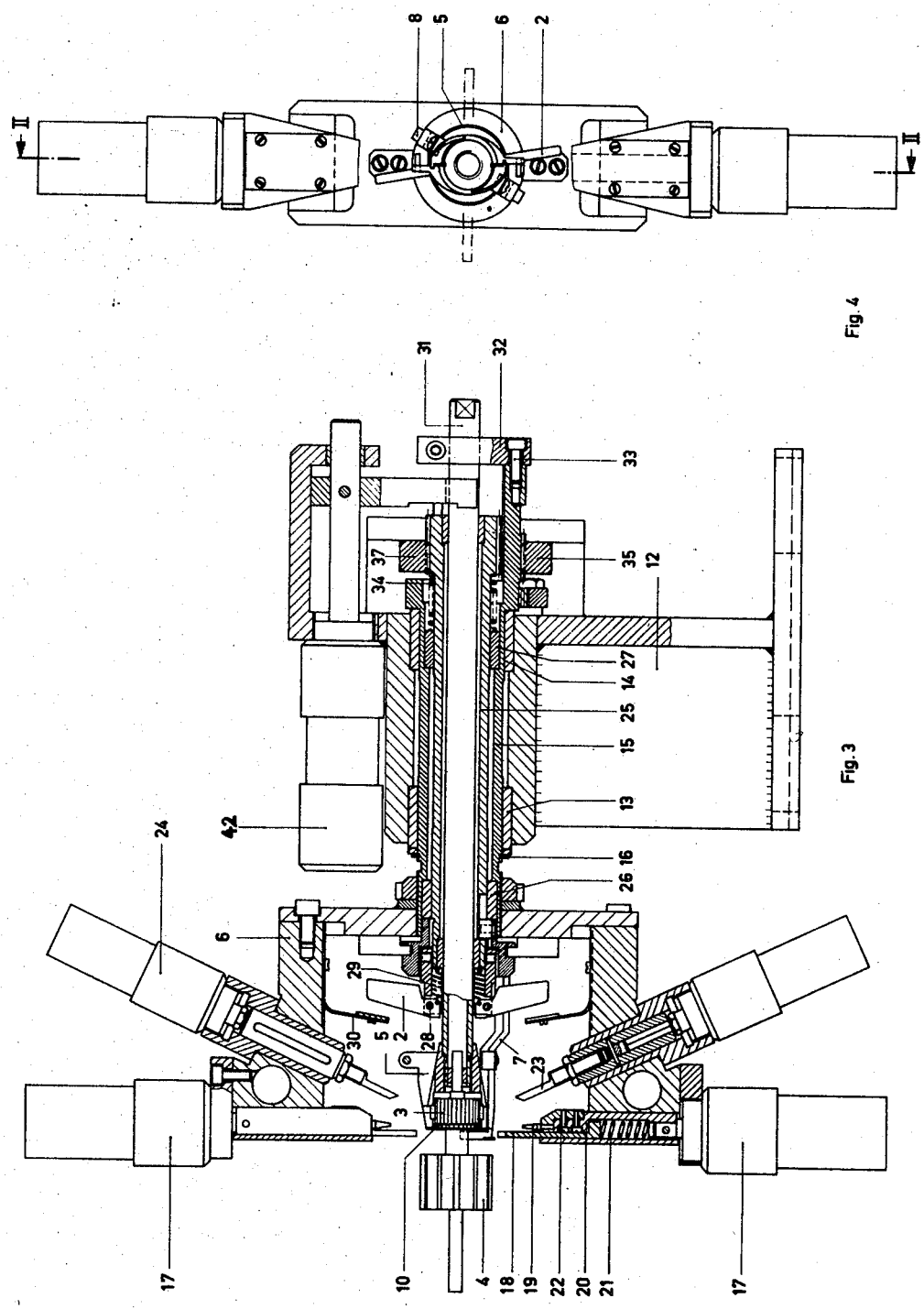
INVENTOR.
Manfred Nussbaumer
BY
Pierce, Scheffler & Parker
Attorneys May 26, 1970    M. NUSSBAUMER    3,513,528
LAYING DEVICE FOR COMMUTATOR CONTACT LOOPS ON AUTOMATIC
ARMATURE WINDING MACHINES FOR UNIVERSAL MOTORS
Filed July 11, 1967    3 Sheets-Sheet 3

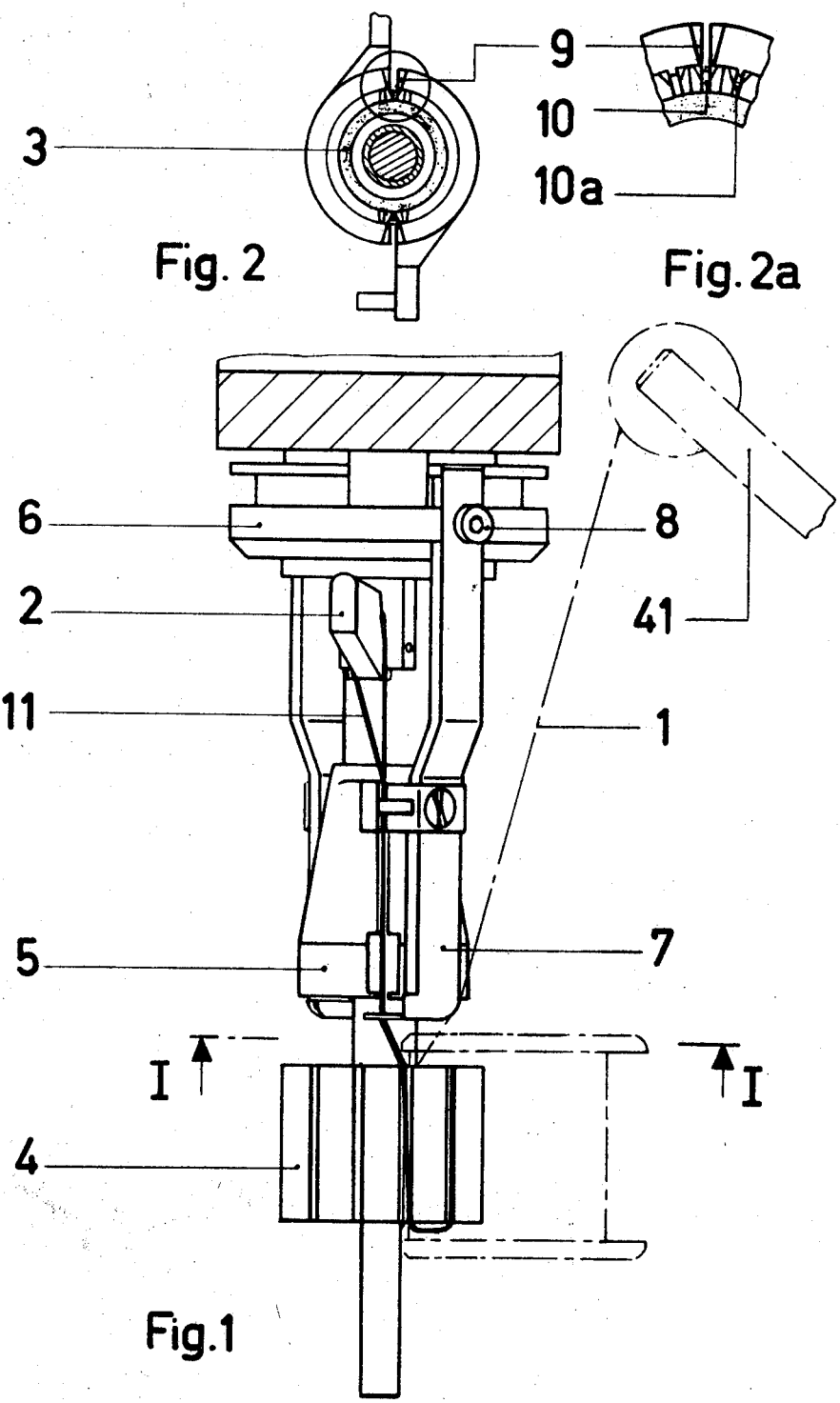

INVENTOR.
Manfred Nussbaumer
BY
Pierce, Scheffler & Parker
Attorneys

United States Patent Office 3,513,528
Patented May 26, 1970

3,513,528
LAYING DEVICE FOR COMMUTATOR CONTACT LOOPS ON AUTOMATIC ARMATURE WINDING MACHINES FOR UNIVERSAL MOTORS
Manfred Nussbaumer, Dietikon, Switzerland, assignor to Micafil A.-G., Zurich, Switzerland, a joint-stock company
Filed July 11, 1967, Ser. No. 652,512
Claims priority, application Austria, Aug. 16, 1966, A 7,777/66
Int. Cl. H02k 15/06
U.S. Cl. 29—205     7 Claims

ABSTRACT OF THE DISCLOSURE

A device for laying in the commutator contact wire loops of coils, after they have been wound into the slots of an armature, comprises a rotatable tool support which surrounds a rotatable cover sleeve over the commutator that includes a slot over which each wire loop is pushed by a finger. The tool support includes a power actuated hold-down tool which presses the wire loop toward the axis of the commutator and, a power actuated tamping tool that tamps the loop into the commutator slot and a power actuated cutting blade which thereafter functions to cut off the portion of the wire loop which protrudes beyond the end of the commutator slot. The wire loop is formed about a hook which is rotatable as well as axially displaceable. The cover sleeve, hook and tool support are secured upon concentric shafts and rotation of these shafts is effected by a gear drive constituted by gear segments on the shafts meshed with rack gears whose longitudinal displacements are determined by a rotatable turret head carrying longitudinally adjustable stop pins which engage the ends of the rack gears. The shaft carrying the tool support is coupled to the shaft carrying the cover sleeve so that one gear drive common to both is utilized.

---

Figure 5:
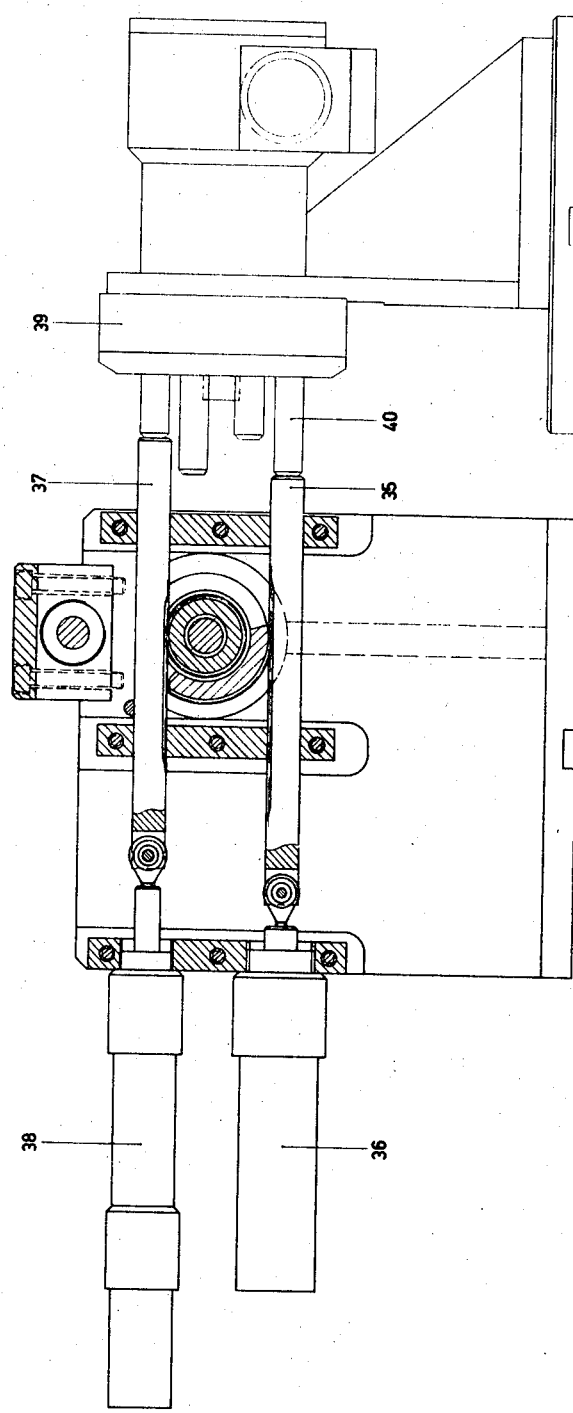

This invention relates to winding machines of the automatic type and more particularly to an improved machine for winding the armatures of universal motors wherein the necessary contact loops for the commutator are laid in automatically.

Machines for winding armatures for 2-pole universal motors are known which operate either in a semi- or fully automatic manner. On one type of winding machine the armatures are clamped to a face plate and set in rotation with the latter so as to wind the wire into the individual slots of the armature, the wire being guided over rotating followers into the slots. Other machines are also known wherein the armature is clamped in a stationary position, and a rotating winding arm winds the wire into the slots. In this case, stationary adjustable, or fixed followers are used for guiding the wire into the slots.

All of these known solutions require, in the case of slotted commutators that the wires and contact loops, respectively of the individual coils formed on the armature be laid in by hand into the slots intermediate adjacent segments of the commutator, and then tamped into position so that they cannot thereafter come out.

In accordance with the present invention, the improved machine lays the coil ends automatically, and correctly connected according to the winding diagram for the armature, into the corresponding slots in the commutator, separates them, and tamps them into place in the slots and then cuts off the portion of each wire loop which protrudes beyond the end of the slot, the tamping and cut-off functions being performed by power actuated tools.

One suitable embodiment of the invention will now be described in detail and is illustrated in the accompanying drawings wherein:

FIG. 1 is a view in plan of a portion of the winding machine showing in particular the loop forming mechanism for the commutator slots;
FIG. 2 is a transverse section on lines I—I of FIG. 1;
FIG. 2a is an enlarged detail of a circled-in portion of FIG. 2;
FIG. 3 is a general view of the entire winding machine in section;
FIG. 4 is a side view of the machine without the clamped armature; and
FIG. 5 illustrates the control of the various movements of the machine.

With reference now to the drawings, it should be noted that only those elements of the machine essential to laying-in the wire loops in the commutator slots are shown, the guide plates and winding arms for winding the armature slots themselves being conventional and hence being deleted since they do not constitute any part of the claimed invention.

In the winding machine to be described, the armature stands still and is held in place on the machine by means of a collet. Winding of the armature slots is effected by two wire guide arms, rotating in opposite directions about the center of the armature body, simultaneous winding of two pairs of armature slots extending symmetrically to the armature axis taking place by the use of followers, not illustrated.

FIG. 1 shows the extension of the wire 1 after drawing a contact loop 11 around the loop hook 2, which for this purpose was turned by 90°, related to the armature axis and entered the winding plane of armature 4, whilst the commutator of which is located within the cover sleeve 5. The contact loop 11 is laid in with a laying finger 7, which is connected by means of a screw 8 with a swivel support 6, in to the conical opening 9 of cover sleeve 5. Corresponding to the switching step of the armature coil, related to the commutator 3, the contact lop 11 for the coil is laid into the proper commuator slot 10 by turning swivel support 6 about the armature axis.

FIGS. 3, 4 and 5 show the control parts for carrying out such an exact laying of the loops. Starting from the swivel support 6, which is mounted in the bearing block 12 by means of the journal bearings 13 and 14 as well as of the swiivel tube 15 for pivotal movement about the armature axis and held axially by a snap ring 16, the main operations are started by the tools mounted thereon. The following tools necessary for laying the wire loops are mounted on the swivel support 6.

For forcing the contact loop 11 into the commutator slot 10 are used the diametrically opposite hold-down elements 18 each actuated by a compressed-air cylinder 17, which presses the wire loop against the armature axis. The tamping tools 19, which are likewise actuated by the compressed-air cylinders 17 fixe the contact loop 11 in the commutator slots 10 by tamping. Each hold-down element 18 and its tamping tool 19 are secured jointly on a holder 20, the hold-down element 18 being pressed by a compression spring 21 against the armature axis. The tamping tool 19 is secured by means of screws 22 on the holder 20 and can be exchanged. Likewise secured on the swivel support 6 are oppositely disposed cutting blades 23 which cut off the wire loop protruding over the commutation slot 10. Each cutting blade 23 is actuated by a compressed-air cylinder 24.

Each loop hook 2, which serves to form a contact loop 11, is secured on a tube 25 which is mounted concentrically within the tube 15 in the bearings 26 and 27.

The loop hook 2 can perform, by way of the tube 25, an axial movement by a compressed-air cylinder 42 which serves to balance the length of the contact loop 11 when it is forced into the commutator slot 10. A compression spring 34 brings the loop hook 2 back into its starting position. Moreover, the wire 1 can be clamped by means of a leaf spring 30 by axial movement of the loop hook 2, which latter is mounted for rotation about the bolt 28 and held in place by the tension spring 29.

The cover sleeve 5, which is screwed on a shaft 31, is rigidly connected by means of a screw 33 with the tube 15 by means of a clamping piece 32. The rotary movement of the swivel support 6 is thus transmitted to the cover sleeve 5. The rotary movement of the swivel support 6 is effected by a rack 35 which is actuated by the compressed-air cylinder 36 as shown in FIG. 5. The rotation of the loop hook 2 is likewise effected by the rack 37 by means of the compressed-air cylinder 38 also shown in FIG. 5. The angle of rotation of the swivel support 6 and of the loop-hook 2 respectively is limited by a turret head 39 with adjustable stops 40, which act on the racks 35 and 37 respectively.

OPERATION

The armature to be wound, which is held in a clamping device not described here, is so introduced into the winding machine that the commutator 3 of the armature 4 comes to lie under the cover sleeve 5.

The wire 1 is laid into the armature slots by the rotating swivel arms 41. After winding two pairs of slots, the armature is turned by one slot division by a device not represented here, and indexed.

In order to hold the contact loop 11, the loop hook 2 turns by 90° from its rest position and comes thus to lie in the winding plane of the wire 1. By changing the direction of rotation of the swivel arm 41, the wire is laid about the loop hook 2. The wire loop 11 thus formed is brought into the proper position to be forced into the commutator slot 10 over the above described control device 25, 37, 38, 39 and 40.

The tools on the swivel support 6 necessary for fixing the contact loop 11 turn likewise into the position necessary for switching the contact loop 11. The hold-down element 18 presses the contact loop 11 against the armature axis and the following tamping tool 19 fixes the latter in the commutator slot 10. At the same time, the loop hook 2, on which the wire loop 11 was formed, is displaced axially toward the armature 4 in order to offset the shortening of the contact loop 11 by the hold-down element 18, caused by the pressing against the armature axis. The wire of the contact loop 11 protruding over the commutator slot 10 is cut off by the cutting blade 23. The remaining contact loop remnant left by this operation is removed from the layer device according to the invention by a tool not described here.

For winding the following coil, the swivel support 6 and the loop-hook 2 turn back into the original vertical position (see FIG. 4).

For connecting the following contact loop 11, which comes to lie in a different position according to the winding diagram, namely in the following commutator slot 10a, the turrent head 39 turns with the adjustable stops 40 about a certain graduation. The racks 35 and 37 respectively, which perform the rotary movement of the swivel support 6 and of the loop hooks 2 respectively, are limited in their movement by the new position of the stops. It is therefore possible, by individual adjustment of the stops 40 on the turrent head 39, to switch different types of armatures, corresponding to the electrical winding diagram and the switching step respectively.

It has been found that the laying device according to the invention operates exceedingly well when, after laying the coil ends in the commutator slot, the slots are pinched closed only at the top so that the coil ends are movable to and fro in the slot below the pinching point.

All operations are controlled in time by a programmer driven by a synchronous motor and not represented here.

I claim:
1. In a machine for winding the armatures of electrical machines and wherein said armatures are provided with slotted commutators, a device for forming wire loops and laying said loops into the slots in the commutators subsequent to winding the appertaining coils in the slots of the armature which comprises a rotatable cover sleeve surrounding the commutator, said cover sleeve being provided with a slit to receive the wire loop after it is formed, a first shaft on which said cover sleeve is mounted and which is supported for rotation coaxially with the axis of the commutator, a rotatable hook for forming the wire loop, a second tubular shaft to which said hook is secured, said second shaft concentrically surrounding said first shaft and being axially displaceable, a rotatable tool support surrounding said cover sleeve and loop hook, a third tubular shaft to which said tool support is secured, said third shaft concentrically surrounding said second shaft, said tool support having mounted thereon a finger for pressing the wire loop through the slot in said cover sleeve, a power actuated hold-down tool for pressing the wire loop toward the commutator axis and a power actuated tamping tool for tamping the wire loop into the proper commutator slot, and a power actuated blade for cutting off the portion of the wire loop protruding over the commutator slot, and means for effecting controlled rotation of said first, second and third shafts through predetermined angles.

2. A machine as defined in claim 1 wherein said second and third concentric shafts are provided with gear segments, said segments are meshed respectively with rack gears for rotating said shafts in one direction or the other, means for reciprocating said rack gears and means for limiting the respective strokes of said rack gears thereby to effect a corresponding limitation in the rotation of said second and third shafts and hence the rotation of said tool support and hook.

3. A machine as defined in claim 2 and wherein said first shaft is coupled to said third shaft so that said cover sleeve and tool support rotate together.

4. A machine as defined in claim 2 wherein said means for limiting the respective strokes of said rack gears is constituted by a rotatable turret head having longitudinally adjustable stops thereon engageable with the ends of said rack gears.

5. A machine as defined in claim 1 which includes power means to effect an axial displacement of said second shaft from a starting position in the direction moving said loop hook closer to said commutator, and a restoring spring for shifting said second shaft back to its starting position.

6. A machine as defined in claim 1 wherein said hold-down tool and said tamping tool are power actuated from the same unit and which is constituted by a piston and cylinder unit, said tamping tool being secured directly to the piston and said hold-down unit being indirectly secured to the piston by means of a coil spring.

7. A machine as defined in claim 1 wherein the tamping points for the wire head of the armature winding are arranged in axially displaced relation in said commutator slot.

References Cited

UNITED STATES PATENTS 2,385,619   9/1945   Fausset et al. _____ 29—205
3,156,037   11/1964   Warner _____ 29—205

THOMAS H. EAGER, Primary Examiner

U.S. Cl. X.R.

29—208